US012224535B2

(12) United States Patent
Lee et al.

(10) Patent No.: US 12,224,535 B2
(45) Date of Patent: Feb. 11, 2025

(54) MODULARIZED SOCKET STRUCTURE

(71) Applicant: YANG JI CO., LTD., New Taipei (TW)

(72) Inventors: Yueh-Ying Lee, New Taipei (TW); Yueh-Hui Lee, New Taipei (TW)

(73) Assignee: YANG JI CO., LTD., New Taipei (TW)

( * ) Notice: Subject to any disclaimer, the term of this patent is extended or adjusted under 35 U.S.C. 154(b) by 444 days.

(21) Appl. No.: 17/852,084

(22) Filed: Jun. 28, 2022

(65) Prior Publication Data

US 2023/0420895 A1 Dec. 28, 2023

(51) Int. Cl.
*H01R 24/00* (2011.01)
*H01R 13/514* (2006.01)
*H01R 13/66* (2006.01)
*H01R 13/70* (2006.01)
*H01R 24/76* (2011.01)

(52) U.S. Cl.
CPC ........... *H01R 24/76* (2013.01); *H01R 13/514* (2013.01); *H01R 13/665* (2013.01); *H01R 13/70* (2013.01)

(58) Field of Classification Search
CPC .... H01R 24/76; H01R 13/514; H01R 13/665; H01R 13/70
See application file for complete search history.

(56) References Cited

U.S. PATENT DOCUMENTS

| | | | | |
|---|---|---|---|---|
| 5,611,701 A * | 3/1997 | Hahn | H02J 7/0042 439/131 |
| 5,791,921 A * | 8/1998 | Lee | H01R 27/00 439/651 |
| 7,354,286 B1 * | 4/2008 | Lee | H01R 13/652 439/652 |
| 9,331,441 B2 * | 5/2016 | Roy | H01R 24/68 |
| 10,992,093 B1 * | 4/2021 | Lee | H01R 31/06 |
| 11,296,468 B2 * | 4/2022 | Cheng | H01R 31/06 |
| 11,728,597 B1 * | 8/2023 | Lee | H01R 13/642 439/134 |
| 11,757,240 B1 * | 9/2023 | Russell | H01R 24/78 439/492 |
| 2005/0121218 A1 * | 6/2005 | Fang | H01R 13/465 174/53 |

* cited by examiner

*Primary Examiner* — Phuong Chi Thi Nguyen
(74) *Attorney, Agent, or Firm* — Ying-Ting Chen; Law Office of Michael Chen

(57) ABSTRACT

An improved modularized socket structure comprises: a main socket module, first, second and third polar main jacks are formed on a main conductive component of the module; at least one expansion socket module, first, second and third polar expansion jacks are formed on an expansion conductive component of the module; a sub-socket module, first, second and third polar sub-jacks are formed on a sub-conductive component of the module; and an expansion conductive plate set comprising first, second and third conductive plates, the first conductive plate has first extension portions inserted into first polar main jack, first polar expansion jack and first polar sub-jack, the second conductive plate has second extension portions inserted into second polar main jack, second polar expansion jack and second polar sub-jack, and the third conductive plate has third extension portions inserted into third polar main jack, third polar expansion jack and third polar sub-jack.

10 Claims, 8 Drawing Sheets

MODULARIZED SOCKET STRUCTURE

BACKGROUND OF THE INVENTION

Field of Invention

The invention relates to a socket structure, and more particularly to an improved modularized socket structure capable of expanding a number of sockets according to requirements to save manufacturing costs and enhance electrical connection.

Related Art

In today's technologically advanced environment, electrical equipment has become a very important part in everyday life. Electrical equipment is used in everyone's life. The reason why electrical equipment can be used is mainly because of electricity, all types of electrical equipment are energized or charged through electrical connection between the plug with the wire and the socket, but the position of the socket in homes, offices or public places is fixed on the wall when the building is constructed, the number is limited, and the position of the socket cannot be adjusted according to demand. Therefore, in order to enable all electrical equipment to obtain power supply, people usually connect an extension cord with the mains socket, so that there are more sockets available in the living environment and the positions of the sockets can be adjusted by extending with the extension cord, and it is more convenient for users to use electrical equipment.

At present, the extension cords on the market are designed and manufactured with multi-sockets, when designing different extension cords with sockets, it is required to use molds with different numbers of sockets, such as extension cords with three sockets need to use a mold with three sockets to make, extension cords with four sockets need to use a mold with four sockets to make, extension cords with five sockets need to use a mold with five sockets to make, and so on. Therefore, manufacturers need to invest in molds with different numbers of sockets, causing the problems of increased manufacturing costs, and the electrical connection between the molds is not stable enough.

Therefore, the inventor of the invention and relevant manufacturers engaged in this industry are eager to research and make improvement to solve the above-mentioned problems and drawbacks in the prior art.

SUMMARY OF THE INVENTION

Therefore, in order to effectively solve the above-mentioned problems, a main object of the invention is to provide an improved modularized socket structure capable of expanding a number of sockets according to requirements to save manufacturing costs.

Another object of the invention is to provide an improved modularized socket structure capable of enhancing electrical connection.

In order to achieve the above objects, the invention provides an improved modularized socket structure at least comprising: a main socket module, the main socket module having a main top cover, a main conductive component and a main bottom cover assembled with one another, a first polar main jack, a second polar main jack and a third polar main jack being formed on a bottom of the main conductive component; at least one expansion socket module, the expansion socket module having an expansion top cover, an expansion conductive component and an expansion bottom cover assembled with one another, a first polar expansion jack, a second polar expansion jack and a third polar expansion jack being formed on a bottom of the expansion conductive component; a sub-socket module, the sub-socket module having a sub-top cover, a sub-conductive component and a sub-bottom cover assembled with one another, a first polar sub-jack, a second polar sub jack and a third polar sub jack being formed on a bottom of the sub-conductive component; and an expansion conductive plate set, the expansion conductive plate set comprising a first conductive plate, a second conductive plate and a third conductive plate, the first conductive plate being formed with a plurality of first extension portions respectively inserted into the first polar main jack, the first polar expansion jack and the first polar sub-jack, the second conductive plate being formed with a plurality of second extension portions respectively inserted into the second polar main jack, the second polar expansion jack and the second polar sub-jack, and the third conductive plate being formed with a plurality of third extension portions respectively inserted into the third polar main jack, the third polar expansion jack and the third polar sub-jack.

According to one embodiment of the invention, wherein a main socket cover is disposed on the main top cover and a main top engage portion is formed on a rear side of the main top cover, and at least one main bottom engage portion is formed on the main bottom cover.

According to one embodiment of the invention, wherein an expansion socket cover is disposed on the expansion top cover, an expansion top engage member is disposed on a front side of the expansion top cover and is assembled with the main top engage portion, and an expansion top engage portion is formed on a rear side of the expansion top cover, at least one expansion bottom engage member and at least one expansion bottom engage portion are formed on the expansion bottom cover, and the expansion bottom engage member and the main bottom engage portion are assembled with each other.

According to one embodiment of the invention, wherein a sub-socket cover is disposed on the sub-top cover, and a sub-top engage member is disposed on a front side of the sub-top cover and is assembled with the expansion top engage portion, and at least one sub-bottom engage member is formed on the sub-bottom cover and is assembled with the expansion bottom engage portion.

According to one embodiment of the invention, wherein a main energizing module is disposed on the main conductive component and is assembled with the main socket cover, an expansion energizing module is disposed on the expansion conductive component and is assembled with the expansion socket cover, and a sub-energizing module is disposed on the sub-conductive component and is assembled with the sub-socket cover.

According to one embodiment of the invention, wherein a first through hole is formed on the first conductive plate at each of the first extension portions, and a plurality of first fixing conductive members are respectively inserted into the first through holes to electrically connect with the first extension portions and the main energizing module; a second through hole is formed on the second conductive plate at each of the second extension portions, and a plurality of second fixing conductive members are respectively inserted into the second through holes to electrically connect with the second extension portions and the expansion energizing module; and a third through hole is formed on the third conductive plate at each of the third extension portions, and a plurality of third fixing conductive members are respectively inserted into the third through holes to electrically connect with the third extension portions and the sub-energizing module.

According to one embodiment of the invention, wherein the main bottom cover is further provided with an electrical connection member and a switch member, the electrical connection member is electrically connected to the switch member, and the switch member is further electrically connected to a main conductive hole.

According to one embodiment of the invention, wherein at least one main top assembly portion is disposed on a bottom of the main top cover, and at least one main bottom assembly portion is disposed on the main bottom cover and is assembled with the main top assembly portion so that the main top cover and the main bottom cover are assembled with each other and cover the main conductive component.

According to one embodiment of the invention, wherein at least one expansion top assembly portion is disposed on a bottom of the expansion top cover, and at least one expansion bottom assembly portion is disposed on the expansion bottom cover and is assembled with the expansion top assembly portion so that the expansion top cover and the expansion bottom cover are assembled with each other and cover the expansion conductive component.

According to one embodiment of the invention, wherein at least one sub-top assembly portion is disposed on a bottom of the sub-top cover, and at least one sub-bottom assembly portion is disposed on the sub-bottom cover and is assembled with the sub-top assembly portion so that the sub-top cover and the sub-bottom cover are assembled with each other and cover the sub-conductive component.

DETAILED DESCRIPTION OF THE INVENTION

The above objects of the invention, as well as its structural and functional features, will be described in accordance with the preferred embodiments of the accompanying drawings.

In the following, for the formation and technical content related to an improved modularized socket structure of the invention, various applicable examples are exemplified and explained in detail with reference to the accompanying drawings; however, the invention is of course not limited to the enumerated embodiments, drawings, or detailed descriptions.

Furthermore, those who are familiar with this technology should also understand that the enumerated embodiments and accompanying drawings are only for reference and explanation, and are not used to limit the invention; other modifications or alterations that can be easily implemented based on the detailed descriptions of the invention are also deemed to be within the scope without departing from the spirit or intention thereof as defined by the appended claims and their legal equivalents.

And, the directional terms mentioned in the following embodiments, for example: “above”, “below”, “left”, “right”, “front”, “rear”, etc., are only directions referring in the accompanying drawings. Therefore, the directional terms are used to illustrate rather than limit the invention. In addition, in the following embodiments, the same or similar elements will be labeled with the same or similar numerals.

Figure 1:
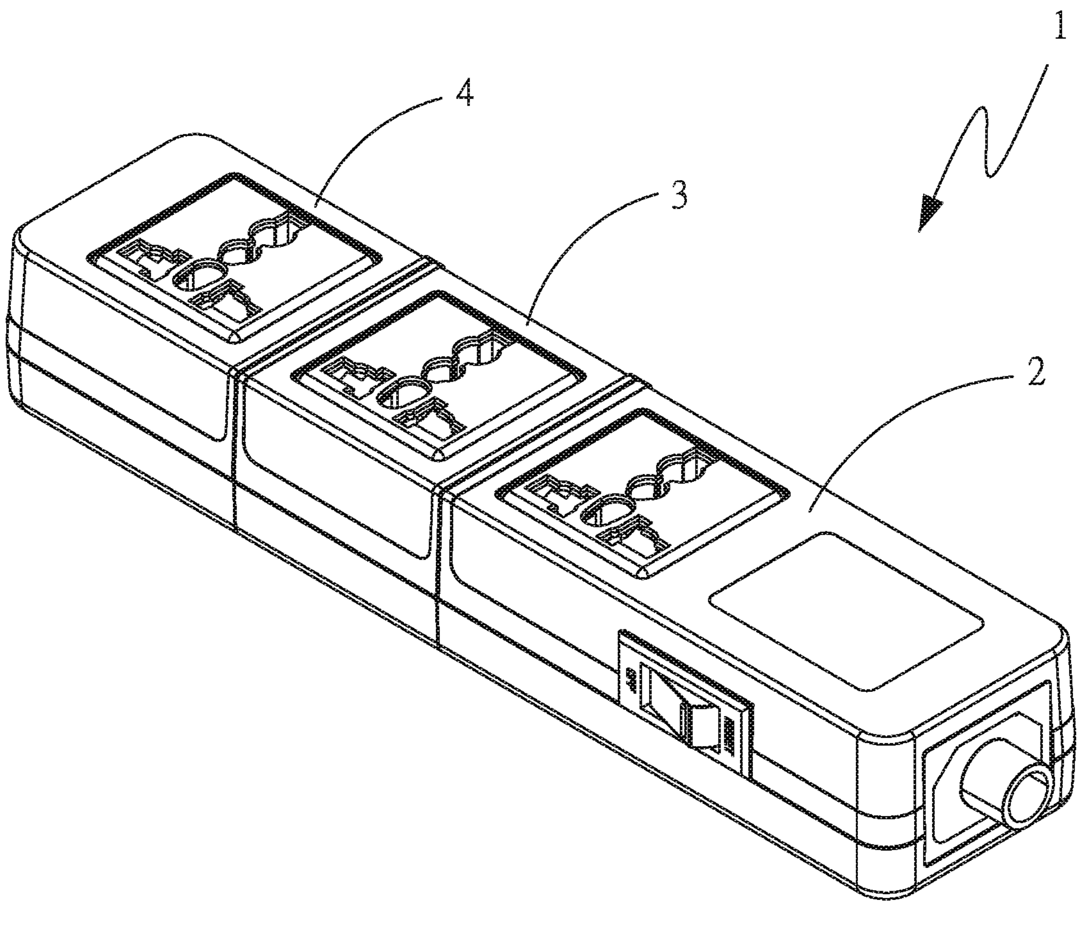
FIG. 1 is a perspective assembly view of an improved modularized socket structure of the invention.
Figure 2:
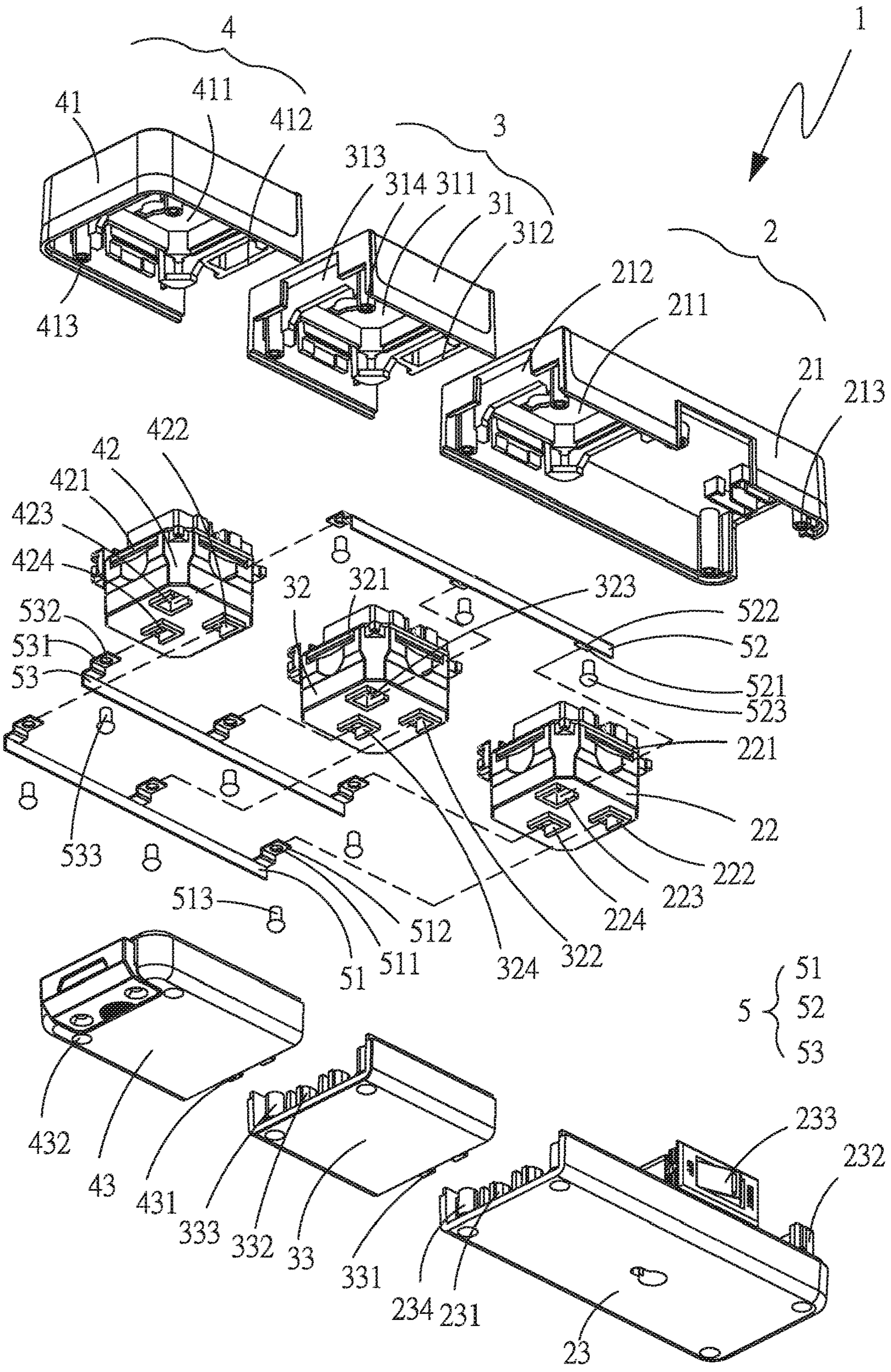
FIG. 2 is a perspective exploded view of the improved modularized socket structure of the invention viewed from another angle.

Please refer to FIG. 1 and FIG. 2 respectively for a perspective assembly view of an improved modularized socket structure 1 and a perspective exploded view of the improved modularized socket structure 1 of the invention viewed from another angle. It can be clearly seen from the figures that the improved modularized socket structure 1 comprises a main socket module 2, at least one expansion socket module 3, a sub-socket module 4 and an expansion conductive plate set 5.

Wherein the main socket module 2 has a main top cover 21, a main conductive component 22 and a main bottom cover 23, and a main socket cover 211 is disposed on a top of the main top cover 21. The main socket cover 211 is a universal jack cover that can correspond to standards of different countries, a main top engage portion 212 is formed on a rear side of the main top cover 21, and at least one main top assembly portion 213 is disposed on a bottom of the main top cover 21, the main top assembly portion 213 is a screw hole in this embodiment, but it is not limited thereto. In addition, a main energizing module 221 is disposed on the main conductive component 22 and is assembled with the main socket cover 211, the main energizing module 221 is a universal conductive plate that can correspond to standards of different countries, and a first polar main jack 222, a second polar main jack 223 and a third polar main jack 224 are formed on a bottom of the main conductive component 22. At least one main bottom engage portion 231 is formed on the main bottom cover 23, the main bottom engage portion 231 is relatively formed on a rear end of the main bottom cover 23, the main bottom cover 23 is provided with an electrical connection member 232 and a switch member 233, the electrical connection member 232 is electrically connected to the switch member 233, and the switch member 233 is further electrically connected to the first polar main jack 222, the second polar main jack 223 and the third polar main jack 224. At least one main bottom assembly portion 234 is disposed on the main bottom cover 23, the main bottom assembly portion 234 is a screw hole in this embodiment, but it is not limited thereto, the main bottom assembly portion 234 and the main top assembly portion 213 are assembled with each other and can be screwed and locked with each other by a screwing member so that the main top cover 21 and the main bottom cover 23 are assembled with each other and cover the main conductive component 22.

Wherein the expansion socket module 3 comprises an expansion top cover 31, an expansion conductive component 32 and an expansion bottom cover 33. An expansion socket cover 311 is disposed on the expansion top cover 31, and the expansion socket cover 311 is a universal jack cover that can correspond to standards of different countries. An expansion top engage member 312 is disposed on a front side of the expansion top cover 31, the expansion top engage member 312 is assembled with the main top engage portion 212. An expansion top engage portion 313 is formed on a rear side of the expansion top cover 31, and at least one expansion top assembly portion 314 is disposed on a bottom of the expansion top cover 31, the expansion top assembly portion 314 is a screw hole in this embodiment, but it is not limited thereto. An expansion energizing module 321 is disposed on the expansion conductive component 32 and is assembled with the expansion socket cover 311, and the expansion energizing module 321 is a universal conductive plate that can correspond to standards of different countries. A first polar expansion jack 322, a second polar expansion jack 323 and a third polar expansion jack 324 are formed on a bottom of the expansion conductive component 32. At least one expansion bottom engage member 331 and at least one expansion bottom engage portion 332 are formed on the expansion bottom cover 33, the expansion bottom engage member 331 is formed on a front side of the expansion bottom cover 33 and is assembled with the main bottom engage portion 231, and the expansion bottom engage portion 332 is formed on a rear side of the expansion bottom cover 33. At least one expansion bottom assembly portion 333 is disposed on the expansion bottom cover 33, the expansion bottom assembly portion 333 is a screw hole in this embodiment, but it is not limited thereto, and the expansion bottom assembly portion 333 and the expansion top assembly portion 314 are assembled with each other and can be screwed and locked with each other by a screwing member so that the expansion top cover 31 and the expansion bottom cover 33 are assembled with each other and cover the expansion conductive component 32.

Wherein the sub-socket module 4 comprises a sub-top cover 41, a sub-conductive component 42 and a sub-bottom cover 43. A sub-socket cover 411 is disposed on the sub-top cover 41, and the sub-socket cover 411 is a universal jack cover that can correspond to standards of different countries. A sub-top engage member 412 is disposed on a front side of the sub-top cover 41, the sub-top engage member 412 is assembled with the expansion top engage portion 313, and at least one sub-top assembly portion 413 is disposed on a bottom of the sub-top cover 41, the sub-top assembly portion 413 is a screw hole in this embodiment, but it is not limited thereto. A sub-energizing module 421 is disposed on the sub-conductive component 42 and is assembled with the sub-socket cover 411, and the sub-energizing module 421 is a universal conductive plate that can correspond to standards of different countries. A first polar sub jack 422, a second polar sub jack 423 and a third polar sub jack 424 are formed on a bottom of the sub-conductive component 42. At least one sub-bottom engage member 431 is formed on the sub-bottom cover 43, the sub-bottom engage member 431 is formed on a front side of the sub-bottom cover 43 and is assembled with the expansion bottom engage portion 332. At least one sub-bottom assembly portion 432 is disposed on the sub-bottom cover 43, the sub-bottom assembly portion 432 is a screw hole in this embodiment, but it is not limited thereto, and the sub-bottom assembly portion 432 and the sub-top assembly portion 413 are assembled with each other and can be screwed and locked with each other by a screwing member so that the sub-top cover 41 and the sub-bottom cover 43 are assembled with each other and cover the sub-conductive component 42.

Wherein the expansion conductive plate set 5 comprises a first conductive plate 51, a second conductive plate 52 and a third conductive plate 53, the first conductive plate 51 is formed with a plurality of first extension portions 511, and a first through hole 512 is formed on the first conductive plate 51 at each of the first extension portions 511. The first extension portions 511 are respectively inserted into the first polar main jack 222, the first polar expansion jack 322 and the first polar sub jack 422. The first conductive plate 51 has a plurality of first fixing conductive members 513, the first fixing conductive members 513 are respectively inserted into the first through holes 512 to electrically connect with the first extension portions 511 and the main energizing module 221. The second conductive plate 52 is formed with a plurality of second extension portions 521, and a second through hole 522 is formed on the second conductive plate 52 at each of the second extension portions 521. The second extension portions 521 are respectively inserted into the second polar main jack 223, the second polar expansion jack 323 and the second polar sub-jack 423. The second conductive plate 52 has a plurality of second fixing conductive members 523, the second fixing conductive members 523 are respectively inserted into the second through holes 522 to electrically connect with the second extension portions 521 and the expansion energizing module 321. The third conductive plate 53 is formed with a plurality of third extension portions 531, and a third through hole 532 is formed on the third conductive plate 53 at each of the third extension portions 531. The third extension portions 531 are respectively inserted into the third polar main jack 224, the third polar expansion jack 324 and the third polar sub jack 424. The third conductive plate 53 has a plurality of third fixing conductive members 533, the third fixing conductive members 533 are respectively inserted into the third through holes 532 to electrically connect with the third extension portions 531 and the sub-energizing module 421. Accordingly, a first polarity (e.g., positive pole) of the main energizing module 221, the expansion energizing module 321 and the sub-energizing module 421 can be electrically connected by the first conductive plate 51 and fixedly connected by the first fixing conductive members 513; a second polarity (e.g., negative pole) of the main energizing module 221, the expansion energizing module 321 and the sub-energizing module 421 can be electrically connected by the second conductive plate 52 and fixedly connected by the second fixing conductive members 523; and a third polarity (e.g., grounding) of the main energizing module 221, the expansion energizing module 321 and the sub-energizing module 421 can be electrically connected by the third conductive plate 53 and fixedly connected by the third fixing conductive members 533; thereby capable of expanding a number of sockets according to requirements to achieve efficacies of saving manufacturing costs and enhancing electrical connection.

Figure 3:
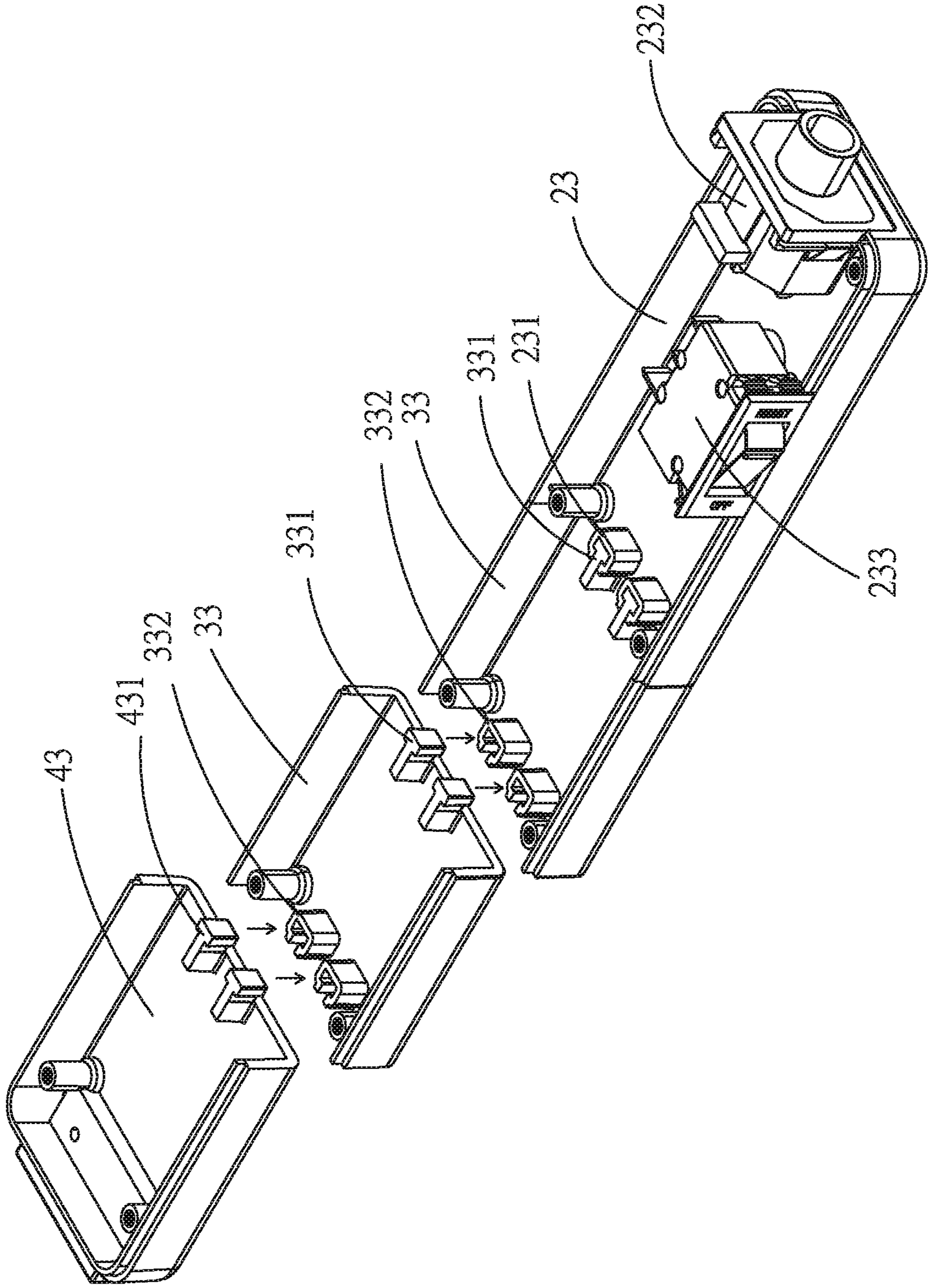
FIG. 3 is a perspective view of assembling an additional expansion bottom cover to the improved modularized socket structure of the invention.

Please refer to the aforementioned drawings and FIG. 3 for a perspective view of assembling an additional expansion bottom cover to the improved modularized socket structure 1 of the invention, wherein the improved modularized socket structure 1 is capable of increasing a number of the expansion socket module 3 based on requirements, and in this embodiment, it is implemented by adding a set of the expansion socket module 3. An assembly method for expanding with the additional expansion socket module 3 can be carried out by first assembling the main bottom cover 23 with the expansion bottom cover 33, so that the expansion bottom engage member 331 of the expansion bottom cover 33 and the main bottom engage portion 231 of the main bottom cover 23 are assembled with each other. Then the expansion bottom engage member 331 of the other expansion bottom cover 33 is assembled with the expansion bottom engage portion 332 of the installed expansion bottom cover 33, so that the main bottom cover 23 and the two expansion bottom covers 33 are assembled with one another, a number of the expansion bottom cover 33 can be increased according to requirements and the expansion bottom covers 33 can be assembled in sequence, and a number of the expansion bottom cover 33 is not limited in the invention. Then the expansion bottom cover 33 at an end and the sub-bottom cover 43 are assembled with each other.

Figure 4:
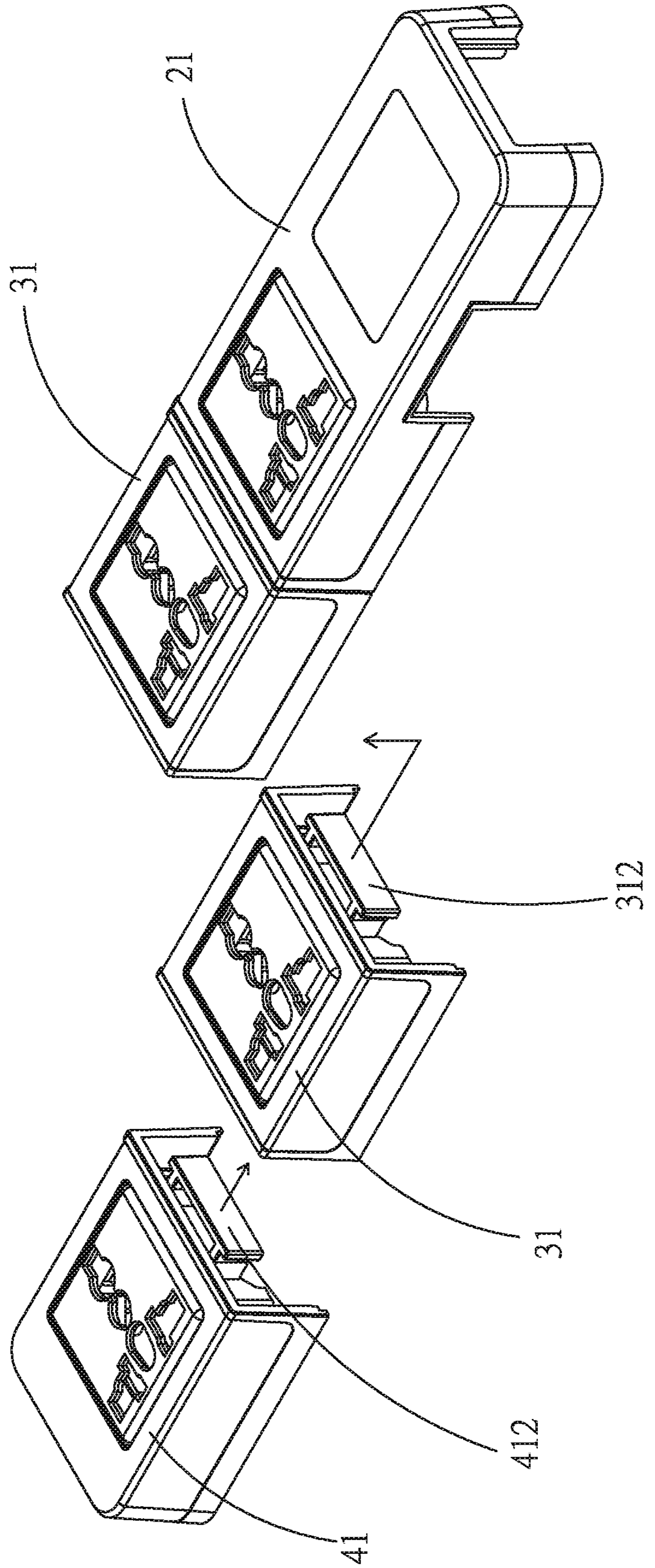
FIG. 4 is a perspective view of assembling an additional expansion top cover to the improved modularized socket structure of the invention.

Please refer to the aforementioned drawings and FIG. 4 for a perspective view of assembling an additional expansion top cover to the improved modularized socket structure 1 of the invention. The expansion top engage member 312 of the expansion top cover 31 and the main top engage portion 212 of the main top cover 21 are assembled with each other. Then the expansion top engage member 312 of the other expansion top cover 31 is assembled with the expansion top engage portion 313 of the installed expansion bottom cover 33, so that the main top cover 21 and the two expansion top covers 31 are assembled with one another, a number of the expansion top cover 31 can be increased according to requirements and the expansion top covers 31 can be assembled in sequence, and a number of the expansion top cover 31 is not limited in the invention. Then the expansion top cover 31 at an end and the sub-top cover 41 are assembled with each other.

Figure 5:
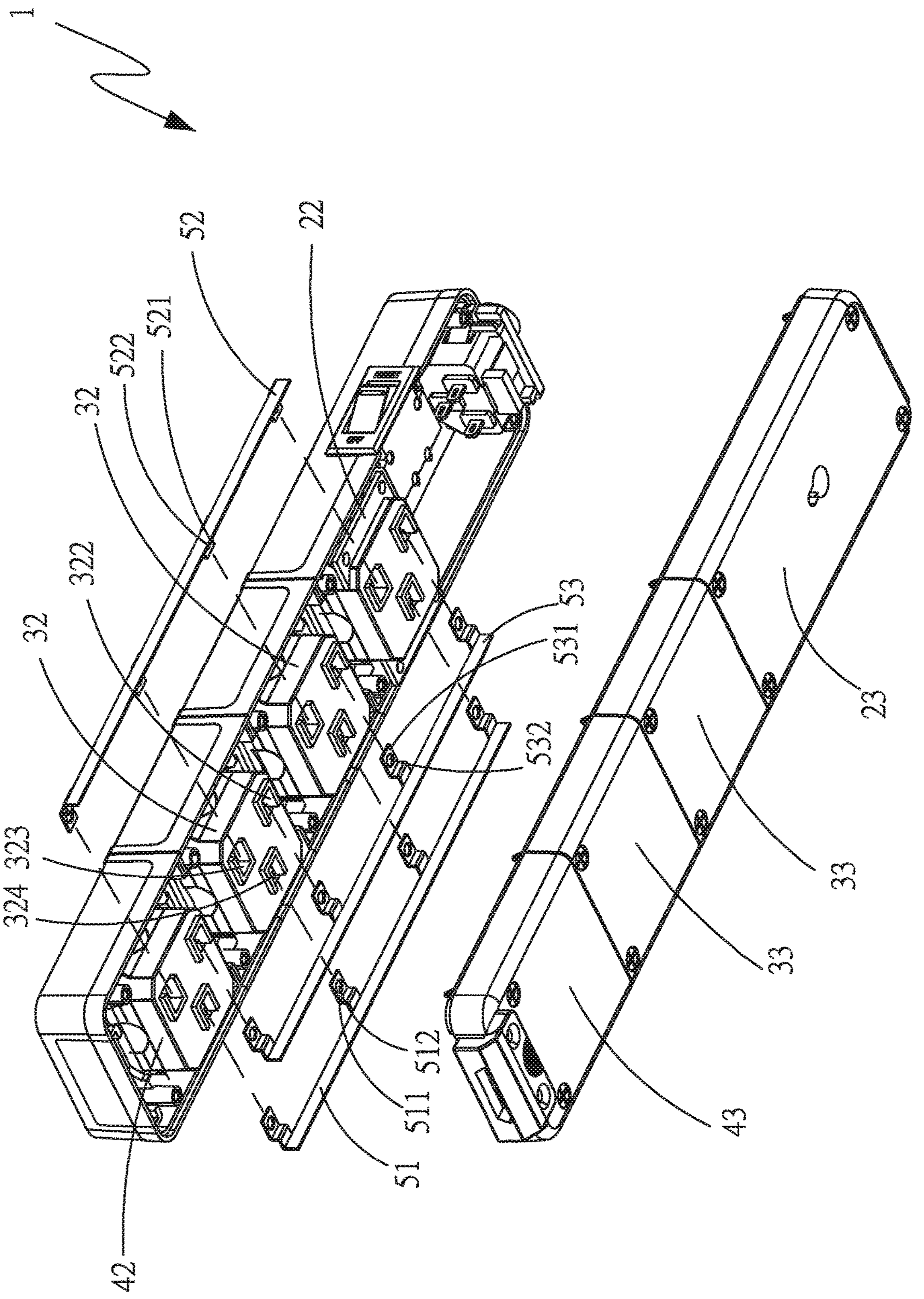
FIG. 5 is a perspective view of assembling an additional expansion conductive component to the improved modularized socket structure of the invention.

Please refer to the aforementioned drawings and FIG. 5 for a perspective view of assembling an additional expansion conductive component to the improved modularized socket structure 1 of the invention, wherein after the main top cover 21 is assembled with two sets of the expansion top cover 31 and the sub-top cover 41, and the main bottom cover 23 is assembled with two sets of the expansion bottom cover 33 and the sub-bottom cover 43, the main conductive component 22 and one of the expansion conductive components 32 are assembled with each other, and a number of the extension portions of each of the conductive plates of the expansion conductive plate set 5 can be determined to correspond to a number of the expansion conductive components 32, so that the main conductive component 22 and the two expansion conductive components 32 can be assembled with one another, and then the expansion conductive component 32 at an end and the sub-conductive component 42 are assembled with each other, wherein an order in which the main socket module 2, the expansion socket module 3, and the sub-socket module 4 being assembled with one another is not limited.

Figure 6:
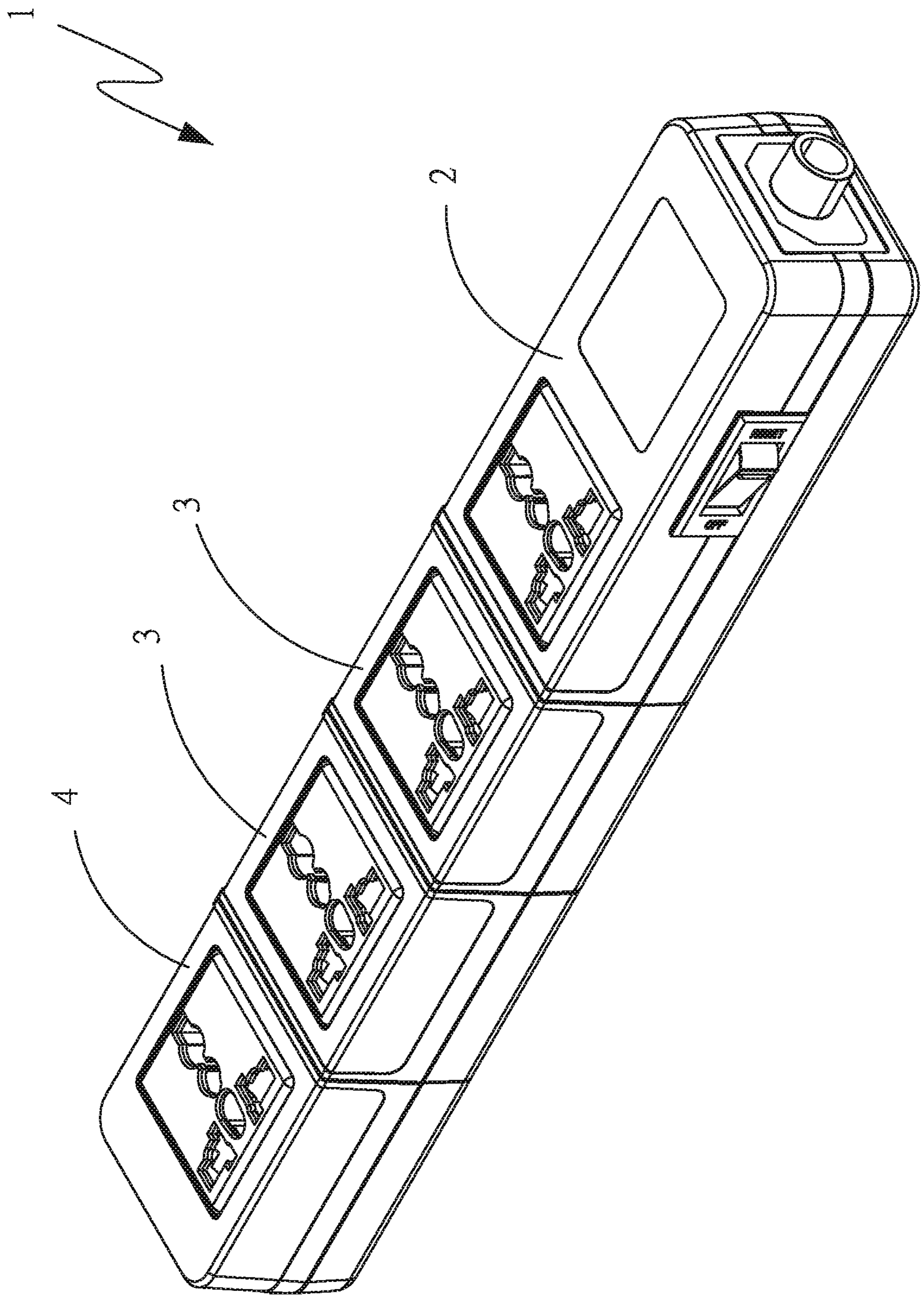
FIG. 6 is a first perspective expanded view of the improved modularized socket structure of the invention.
Figure 7:
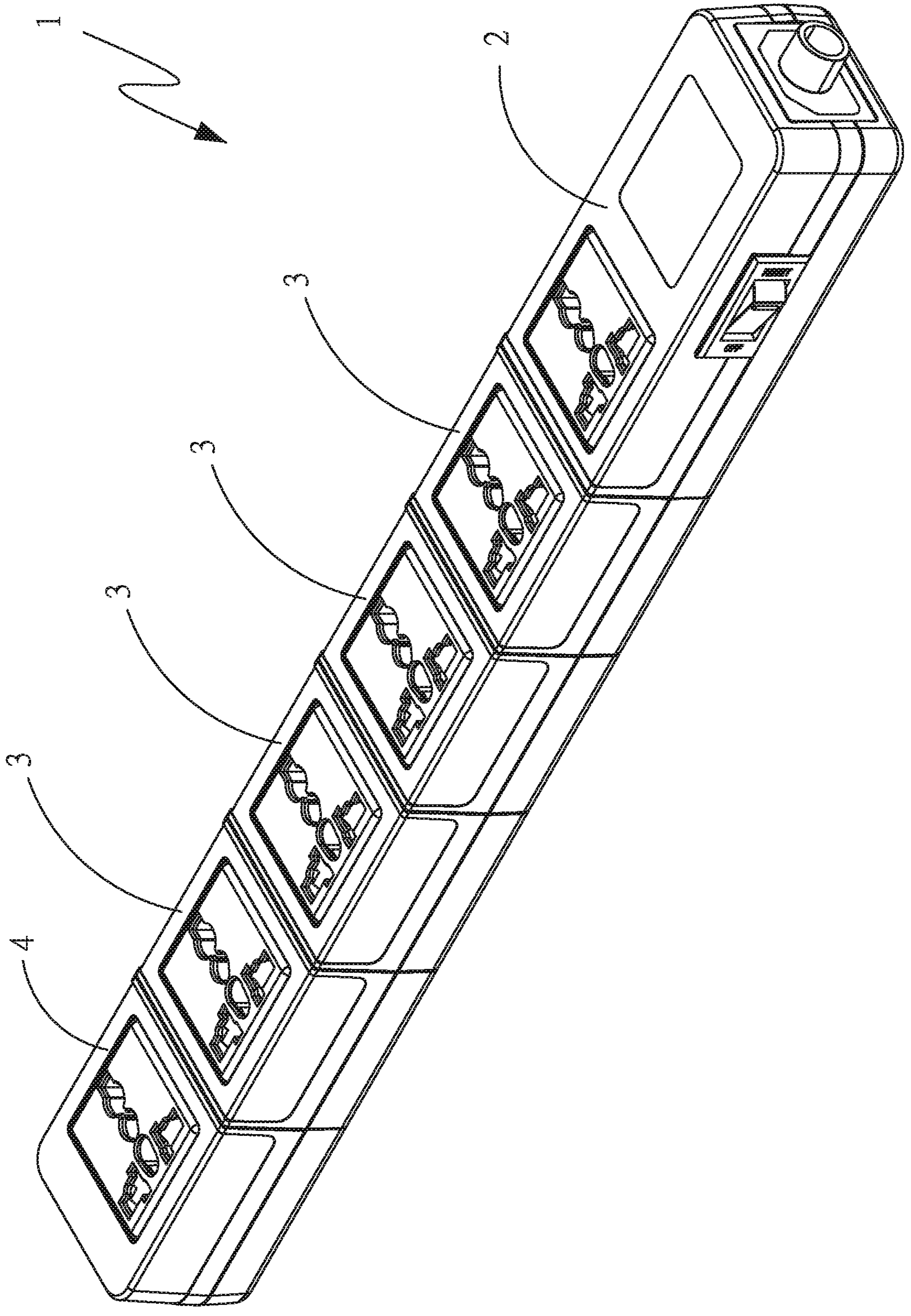
FIG. 7 is a second perspective expanded view of the improved modularized socket structure of the invention.

Please refer to the aforementioned drawings and FIGS. 6 and 7 respectively for a first perspective expanded view and a second perspective expanded view of the improved modularized socket structure 1 of the invention, wherein after a number of the expansion top covers 31 to be expanded are assembled between the main top cover 21 and the sub-top cover 41; a number of the expansion conductive components 32 to be expanded are assembled between the main conductive component 22 and the sub-conductive component 42; and a number of the expansion bottom covers 33 to be expanded are assembled between the main bottom cover 23 and the sub-bottom cover 43, the main top cover 21 and the main bottom cover 23; the expansion top cover 31 and the expansion bottom cover 3; and the sub-top cover 41 and the sub-bottom cover 43 can be assembled with each other by screwing members, so that the improved modularized socket structure 1 has a number of sockets that meet requirements, thereby capable of expanding a number of sockets according to requirements to achieve an efficacy of saving manufacturing costs.

Figure 8:
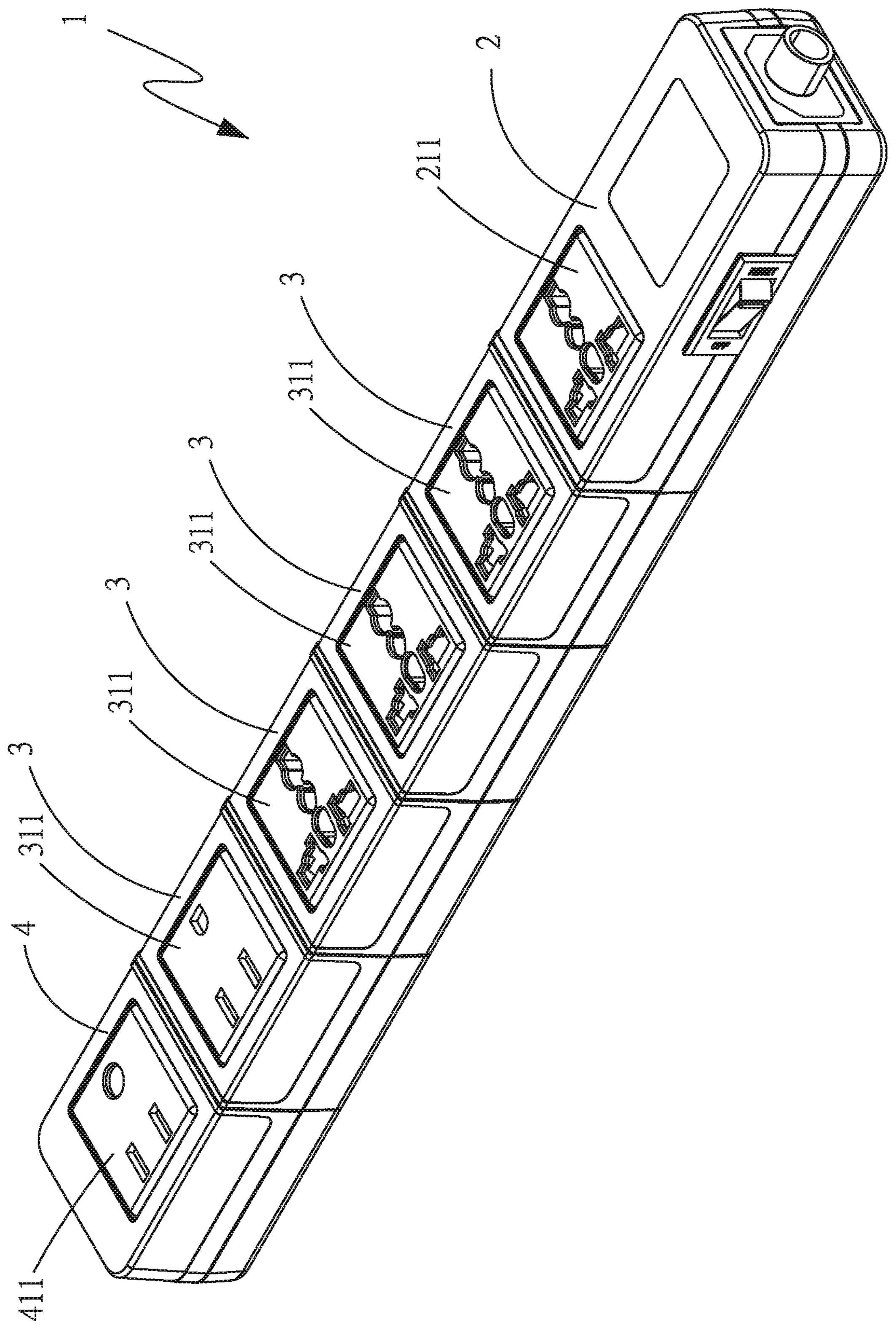
FIG. 8 is a perspective view of replaced socket covers of the improved modularized socket structure of the invention.

Please refer to the aforementioned drawings and FIG. 8 for a perspective view of replaced socket covers of the improved modularized socket structure 1 of the invention, wherein the main socket cover 211, the expansion socket cover 311 and the sub-socket cover 411 are universal jack covers that can correspond to standards of different countries; and the main energizing module 221, the expansion energizing module 321, and the sub-energizing module 421 are universal conductive plates that can correspond to standards of different countries.

It is to be understood that the above description is only preferred embodiments of the invention and is not used to limit the invention, and changes in accordance with the concepts of the invention may be made without departing from the spirit of the invention, for example, the equivalent effects produced by various transformations, variations, modifications and applications made to the configurations or arrangements shall still fall within the scope covered by the appended claims of the invention.

What is claimed is:

1. An improved modularized socket structure comprising:

a main socket module, the main socket module having a main top cover, a main conductive component and a main bottom cover assembled with one another, a first polar main jack, a second polar main jack and a third polar main jack being formed on a bottom of the main conductive component;

at least one expansion socket module, the expansion socket module having an expansion top cover, an expansion conductive component and an expansion bottom cover assembled with one another, a first polar expansion jack, a second polar expansion jack and a third polar expansion jack being formed on a bottom of the expansion conductive component;

a sub-socket module, the sub-socket module having a sub-top cover, a sub-conductive component and a sub-bottom cover assembled with one another, a first polar sub-jack, a second polar sub-jack and a third polar sub jack being formed on a bottom of the sub-conductive component; and an expansion conductive plate set, the expansion conductive plate set comprising a first conductive plate, a second conductive plate and a third conductive plate, the first conductive plate being formed with a plurality of first extension portions respectively inserted into the first polar main jack, the first polar expansion jack and the first polar sub-jack, the second conductive plate being formed with a plurality of second extension portions respectively inserted into the second polar main jack, the second polar expansion jack and the second polar sub-jack, and the third conductive plate being formed with a plurality of third extension portions respectively inserted into the third polar main jack, the third polar expansion jack and the third polar sub-jack.

2. The improved modularized socket structure as claimed in claim 1, wherein the main bottom cover is further provided with an electrical connection member and a switch member, the electrical connection member is electrically connected to the switch member, and the switch member is further electrically connected to a main conductive hole.

3. The improved modularized socket structure as claimed in claim 1, wherein at least one main top assembly portion is disposed on a bottom of the main top cover, and at least one main bottom assembly portion is disposed on the main bottom cover and is assembled with the main top assembly portion so that the main top cover and the main bottom cover are assembled with each other and cover the main conductive component.

4. The improved modularized socket structure as claimed in claim 1, wherein at least one expansion top assembly portion is disposed on a bottom of the expansion top cover, and at least one expansion bottom assembly portion is disposed on the expansion bottom cover and is assembled with the expansion top assembly portion so that the expansion top cover and the expansion bottom cover are assembled with each other and cover the expansion conductive component.

5. The improved modularized socket structure as claimed in claim 1, wherein at least one sub-top assembly portion is disposed on a bottom of the sub-top cover, and at least one sub-bottom assembly portion is disposed on the sub-bottom cover and is assembled with the sub-top assembly portion so that the sub-top cover and the sub-bottom cover are assembled with each other and cover the sub-conductive component.

6. The improved modularized socket structure as claimed in claim 1, wherein a main socket cover is disposed on the main top cover and a main top engage portion is formed on a rear side of the main top cover, and at least one main bottom engage portion is formed on the main bottom cover.

7. The improved modularized socket structure as claimed in claim 6, wherein an expansion socket cover is disposed on the expansion top cover, an expansion top engage member is disposed on a front side of the expansion top cover and is assembled with the main top engage portion, and an expansion top engage portion is formed on a rear side of the expansion top cover, at least one expansion bottom engage member and at least one expansion bottom engage portion are formed on the expansion bottom cover, and the expansion bottom engage member and the main bottom engage portion are assembled with each other.

8. The improved modularized socket structure as claimed in claim 7, wherein a sub-socket cover is disposed on the sub-top cover, and a sub-top engage member is disposed on a front side of the sub-top cover and is assembled with the expansion top engage portion, and at least one sub-bottom engage member is formed on the sub-bottom cover and is assembled with the expansion bottom engage portion.

9. The improved modularized socket structure as claimed in claim 8, wherein a main energizing module is disposed on the main conductive component and is assembled with the main socket cover, an expansion energizing module is disposed on the expansion conductive component and is assembled with the expansion socket cover, and a sub-energizing module is disposed on the sub-conductive component and is assembled with the sub-socket cover.

10. The improved modularized socket structure as claimed in claim 9, wherein a first through hole is formed on the first conductive plate at each of the first extension portions, and a plurality of first fixing conductive members are respectively inserted into the first through holes to electrically connect with the first extension portions and the main energizing module; a second through hole is formed on the second conductive plate at each of the second extension portions, and a plurality of second fixing conductive members are respectively inserted into the second through holes to electrically connect with the second extension portions and the expansion energizing module; and a third through hole is formed on the third conductive plate at each of the third extension portions, and a plurality of third fixing conductive members are respectively inserted into the third through holes to electrically connect with the third extension portions and the sub-energizing module.

* * * * *